T. D. LYNCH.
CONTACT TERMINAL.
APPLICATION FILED JAN. 5, 1915.

1,317,203.

Patented Sept. 30, 1919.

WITNESSES:

INVENTOR
Tillman D. Lynch
BY
ATTORNEY

UNITED STATES PATENT OFFICE.

TILLMAN D. LYNCH, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTACT-TERMINAL.

1,317,203.   Specification of Letters Patent.   Patented Sept. 30, 1919.

Application filed January 5, 1915. Serial No. 606.

*To all whom it may concern:*

Be it known that I, TILLMAN D. LYNCH, a citizen of the United States, and a resident of Wilkinsburg, in the county of Allegheny and State of Pennsylvania, have invented a new and useful Improvement in Contact-Terminals, of which the following is a specification.

My invention relates to contact terminals for knife-blade switches, and has for its object to provide a contact terminal that is cheap to construct yet efficient and reliable in operation.

Heretofore, contact members or jaws for knife-blade switches have been constructed by slotting the upper surfaces of studs and welding the jaws therein. Since the expense of machining the studs and jaws in contact terminals of this character is relatively high, I provide an economical construction that consists in bending a strip of metal to form a substantially U-shaped member which is inserted between the pliable flanges of a casting. I then press the pliable flanges of the casting into engagement with side portions of the U-shaped member to hold the member in position. I provide also openings in the base of the U-shaped member to receive projections on the casting that may be upset to more securely retain the member in position.

Figure 1:
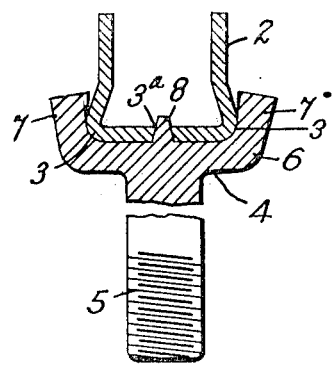
Figure 2:
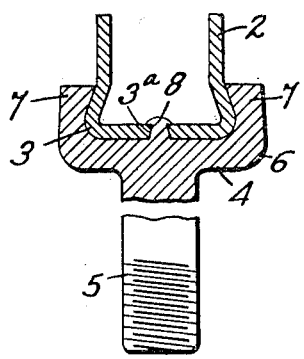

Figure 1 of the accompanying drawing is a detail sectional view of a contact terminal after the first operation in assembling the same has been performed, and Fig. 2 is a detail sectional view of the contact terminal shown in Fig. 1 after the final operation of constructing the same has been performed.

A strip of copper is bent into a substantially U-shaped member 2 having laterally projecting side portions 3 adjacent to its base. The U-shaped member 2 may constitute jaws between which a knife-blade member may be pivoted or with which such member may cooperate to make and break a circuit, or it may be used for any other purpose. The base portion of the U-shaped member 2 is provided with a plurality of openings 3ª, for purposes hereinafter more fully set forth. A drop forging or die-pressed member 4 of copper or brass constitutes a stud member and comprises a substantially cylindrical lower portion 5 and an upper portion 6 that is provided with two pliable flanges 7. The member 5 is provided also with a plurality of projections 8 for insertion in the openings 3ª. The portion 5 of the member 4 may be screw-threaded to receive nuts (not shown) for the purpose of attaching conductors or securing the stud to a switchboard, in accordance with usual practice.

The U-shaped member 2 is disposed between the flanges 7 of the stud member 4, and pressure is applied to the flanges for the purpose of gripping the portions 3 of the member 2 to retain the member in any desired position. The projections 8 may then be upset to prevent lateral movement of the member 2 or the latter may be spot-brazed or soldered to the member 4 with silver solder or any other alloy that will form a bond between the two.

While I have shown my invention in a preferred form, it is not so limited but may be variously modified within the scope of the appended claims.

I claim as my invention:

1. A contact terminal comprising a resilient jaw member having an opening in its inner end, and a stud member having a projection that is adapted to register with the opening in the jaw member and flanges that are adapted to grip the jaw member in position.

2. A contact terminal comprising a one-piece jaw member having an opening in its inner end, and a stud member having a projection that registers with the opening in the jaw member and pliable flanges that grip the jaw member in position.

3. A contact terminal comprising a jaw member having an opening in its inner end, and a stud member having a projection that is adapted to register with the opening in the jaw member and flanges that are adapted to grip the jaw member in position.

In testimony whereof, I have hereunto subscribed my name this 29th day of Dec., 1914.

TILLMAN D. LYNCH.

Witnesses:
GOLDIE E. McGEE,
B. B. HINES.